(12) United States Patent
Israni et al.

(10) Patent No.: US 9,277,752 B2
(45) Date of Patent: Mar. 8, 2016

(54) TRANSFER APPARATUS AND THE METHOD OF USING THE SAME IN A FOOD PREPARATION APPLIANCE

(71) Applicants: Pranoti Nagarkar Israni, Singapore (SG); Rishi Israni, Singapore (SG); Jui Ajit Chitale, Singapore (SG); Ali Syed Muhammad Baber, Singapore (SG)

(72) Inventors: Pranoti Nagarkar Israni, Singapore (SG); Rishi Israni, Singapore (SG); Jui Ajit Chitale, Singapore (SG); Ali Syed Muhammad Baber, Singapore (SG)

(73) Assignee: Zimplistic Pte. Ltd., Singapore (SG)

( * ) Notice: Subject to any disclaimer, the term of this patent is extended or adjusted under 35 U.S.C. 154(b) by 0 days.

(21) Appl. No.: 14/583,040

(22) Filed: Dec. 24, 2014

(65) Prior Publication Data

US 2015/0181896 A1     Jul. 2, 2015

Related U.S. Application Data

(63) Continuation-in-part of application No. 14/445,122, filed on Jul. 29, 2014.

(51) Int. Cl.
| | | |
|---|---|---|
| *A21C 1/08* | (2006.01) | |
| *A21C 3/00* | (2006.01) | |
| *A21C 9/08* | (2006.01) | |
| *A21C 11/00* | (2006.01) | |

(52) U.S. Cl.
CPC . *A21C 9/085* (2013.01); *A21C 9/08* (2013.01); *A21C 11/006* (2013.01)

(58) Field of Classification Search
CPC .......... B23Q 15/00; B23Q 1/706; B23Q 1/72; B23Q 1/74; B23Q 3/00; A21C 1/08; A21C 1/144; A21C 9/08; A21C 14/00; A21C 9/085; A21C 11/006; A21C 1/1455; A21C 1/1425; A21C 1/003

USPC .......... 99/485, 486, 462, 464, 489, 491, 493; 198/429, 430; 492/22, 15, 16, 28, 30, 492/46

See application file for complete search history.

(56) References Cited

U.S. PATENT DOCUMENTS

| | | | | |
|---|---|---|---|---|
| 3,295,656 | A * | 1/1967 | Benier ......................... | 198/429 |
| 4,790,665 | A * | 12/1988 | Hayashi ......................... | 366/98 |
| 4,813,860 | A * | 3/1989 | Jonsson et al. ................ | 425/142 |
| 5,354,571 | A * | 10/1994 | Morikawa et al. ............ | 426/496 |
| 5,460,081 | A * | 10/1995 | Ueno et al. .................... | 99/450.2 |
| 5,630,358 | A * | 5/1997 | Patel ................................ | 99/349 |
| 5,980,438 | A * | 11/1999 | van Haag et al. ................ | 492/7 |
| 6,202,544 | B1 * | 3/2001 | Martinez ......................... | 99/331 |
| RE37,706 | E * | 5/2002 | Chung ............................. | 99/404 |
| 7,040,617 | B2 * | 5/2006 | Zembko et al. ............... | 271/272 |
| 7,668,497 | B2 * | 2/2010 | Maeda et al. .................. | 399/330 |
| 8,820,221 | B2 | 9/2014 | Israni | |
| 2002/0033102 | A1 * | 3/2002 | Graham et al. ................. | 99/404 |
| 2002/0034571 | A1 * | 3/2002 | Zimmerman et al. ........ | 426/549 |

(Continued)

*Primary Examiner* — David Angwin
*Assistant Examiner* — Michael Laflame, Jr.
(74) *Attorney, Agent, or Firm* — Geeta Kadambi Riddhi IP LLC

(57) ABSTRACT

A novel transfer apparatus having several movable parts is used for moving the dough product from a first position to a final position. The transfer apparatus uses the arm to move the dough product and a motor and software that controls the movement of the arm. A roller residing in the arm also has its own motor and software to control its rotational movement. The components of the arm such as a roller, back support and the flap each have their own unique shape and structure to maximize efficiency. The transfer apparatus may be used as an insertable apparatus in any food processing machine and also used as an integral part of the flat bread making machine.

10 Claims, 4 Drawing Sheets

(56) References Cited

U.S. PATENT DOCUMENTS

| | | | |
|---|---|---|---|
| 2004/0083900 A1* | 5/2004 | Rousseau | 99/385 |
| 2005/0170031 A1* | 8/2005 | Lambauer et al. | 425/363 |
| 2007/0171766 A1* | 7/2007 | Loiselet | 366/92 |
| 2008/0032005 A1* | 2/2008 | Fu et al. | 426/94 |
| 2009/0226587 A1* | 9/2009 | Morikawa et al. | 426/502 |
| 2010/0107899 A1* | 5/2010 | Tomatis | 99/443 R |
| 2011/0059209 A1* | 3/2011 | Khatchadourian | 426/232 |
| 2012/0185086 A1* | 7/2012 | Khatchadourian et al. | 700/233 |

\* cited by examiner

TRANSFER APPARATUS AND THE METHOD OF USING THE SAME IN A FOOD PREPARATION APPLIANCE

CROSS RELATED APPLICATIONS

This application claims priority to a Provisional Application 2013096128 filed on Dec. 16, 2013 in Singapore and a continuation in part of now pending U.S. Utility application Ser. No. 14/445,122 filed on 29 Jul. 2014 are hereby incorporated by reference in its entireties for all of its teachings.

FIELD OF THE INVENTION

This disclosure relates generally to a transfer apparatus acting as a sweeper to transfer a dough product from a first place to a final place for a food preparation appliance.

BACKGROUND

For food preparation appliances that make dough products, a common problem would be that the dough products tend to be sticky and stick to a surface. Therefore it can be difficult to transport these dough products, for example from the kneading station to the cooking station. There is a need for a transfer method and structure that can enable a quick transfer.

SUMMARY OF INVENTION

The present invention discloses a transfer apparatus and a method of using the same for a food preparation appliance. In one embodiment, the transfer apparatus has a motor (an actuator for example) a sensor and an arm. In another embodiment, a food preparation appliance may house the transfer apparatus.

In one embodiment, the transfer apparatus has a transfer motor which moves the arm from a first position to a second position. In another embodiment, the movement may be straight, an arc, linear or various other types of motion and a combination thereof. Preferably, the arm moves from the first position to the second position in an arc-like sweeping manner.

In one embodiment, the arm, comprises of a roller, back support and a flap. The arm, in another embodiment, may have a heating element to reduce the stickiness of the dough product that it is being transferred. The roller, in one embodiment, has a specific shape, specific surface structure and specific center structure to move a dough product without the roller sticking to the dough product.

In another embodiment, the specific center structure is a hollow cylinder with a reinforced wall to maintain rigidity and structural integrity. In another embodiment, the specific surface has a plurality of grooves along the length of the roller. The roller may be hollow where there are no reinforcements.

In one embodiment, the roller is a cylindrical drum. Preferably roller is connected to, and extends across the length of arm. Roller is powered by roller motor such that roller can rotate around an axis. The arm has flap at its outer edge. Preferably, flap has a surface that is flush with both back support and roller. The roller, in one embodiment, sits enclosed in back support and is secured by the flap to form an arm. In another embodiment, wherein the specific surface has at least one of a plurality of grooves, a recessed surface, a raised surface along the length of the roller and/or the surface of the flap to minimize sticking of the dough product.

In one embodiment, a position and/or speed are determined using a sensor to calculate a position and speed of the arm. The sensor data is used by the software residing in a processor provides a feedback to control the position and speed of the arm. The software, in an embodiment, has a self-learning capability to provide feedback to the arm. In one embodiment, a motor is used for providing movement to the roller. In one embodiment, a gearbox coupled to the actuator of the arm is used for providing movement to the roller. In one embodiment, a motor is used for providing movement to the arm. In one embodiment, a gearbox coupled to the actuator of the roller is used for providing movement to the arm. In another embodiment, the entire ensemble of transfer apparatus comprising of the flap, roller, the motor, the position and speed sensor and a processor hosting the software is housed in enclosed housing. In another embodiment, the rotational speed of roller is detected by counting lines on a disc that passes through an optical sensor encoder. In another embodiment, the rotational speed of arm is detected by counting lines on a disc that passes through an optical sensor encoder.

The roller, in one embodiment, sits enclosed in a back support and is secured by the flap. Since the center is hollow it has a free movement opportunity within that space to exert tangential and forward force to a dough ball for example.

In one embodiment, a method of using the transfer apparatus is described. A method to transfer a dough ball or a dough product using a transfer apparatus comprises of contacting the dough ball resting on a transfer station using an arm of the transfer apparatus. The stickiness of the dough ball creates a resistance force. The resistance is detected by change of speed and/or change of rate of speed of the arm and/or roller. In another embodiment, the resistance is determined from the dough ball/product using a sensor. In another embodiment, a tangential force and a forward movement force that is required by the roller to move the dough ball is determined using the sensor data.

In one embodiment, once the resistance has been determined the exertion of the tangential force and the forward movement force to the dough ball using the roller and the speed and angular movement of the arm is changed suitably. In another embodiment, if there is any resistance in the forward motion from the dough ball the method is rejected and a message is displayed to the user regarding the rejection due to high resistance from the dough ball.

Cleaning of these apparatus and appliances are a nightmare for all that use them. In one embodiment, it has been made very convenient to cleaning the roller by detaching the roller after removing the flap from the arm.

Other features and advantages will be apparent from the detailed description, taken in conjunction with the accompanying drawings, which illustrate, by way of example, the principles of the current apparatus, system and method.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from accompanying drawings and from the detailed description that follows.

DETAILED DESCRIPTION

Several components for a system, apparatus and method of moving a dough product from a first position to a final position using a transfer apparatus are disclosed. Although the present embodiments have been described with reference to specific example embodiments, it will be evident that various modifications and changes may be made to these embodiments without departing from the broader spirit and scope of the various embodiments.

The instant application is an improvement of the previous application Pranoti Nagarkar Israni (2013) wherein a different type of transfer unit is described. The instant disclosure describes a transfer apparatus that is being used by a food making appliance to place the instantly made dough ball from a first position to a final position for further use.

In the instant disclosure a transfer apparatus comprises of a processor hosting the software, an arm, a roller, a sensor and an actuator for arm and/or roller. Each part is described in the following paragraphs.

Figure 1:
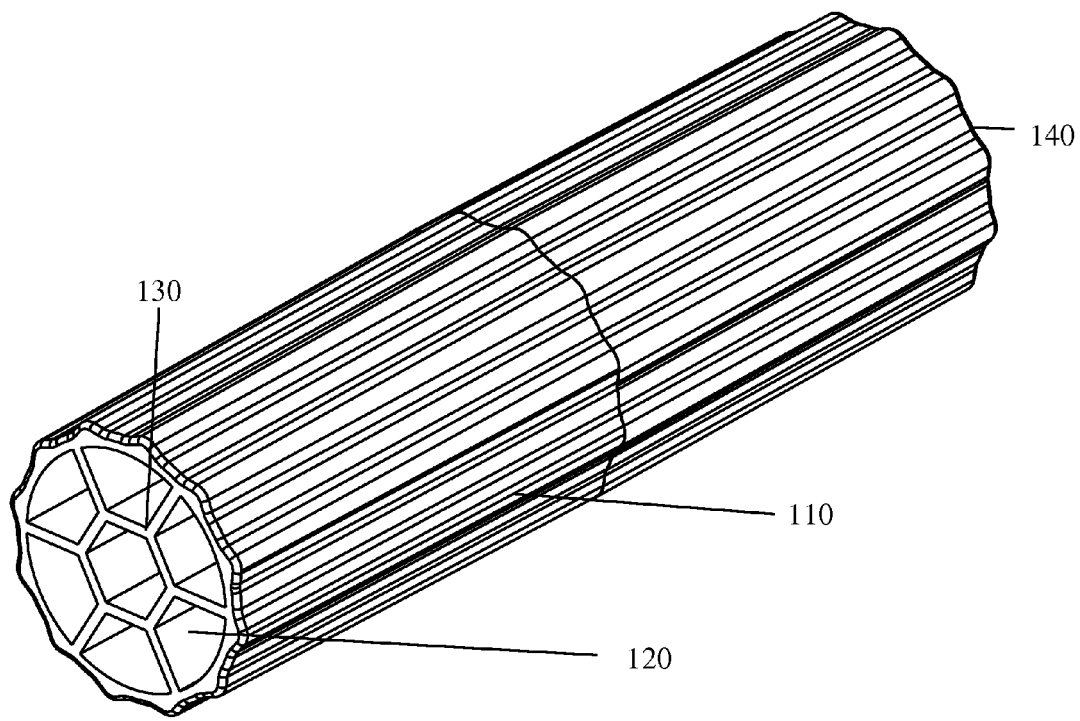
FIG. 1 show a perspective view of a roller 110.

FIG. 1 shows a perspective view of roller 110. Preferably, roller 110 has a plurality of grooves 140. Preferably grooves 140 extend length-wise across roller 110. Grooves 140 are shaped such that they protrude out to act as "teeth" to exert just enough upward pressure. The material to make the roller and the surface texturing can be done using any material or shape or surface finish just so that it prevents or minimizes the sticking of the dough ball or the food product by reducing surface area coming in contact with food product. The roller 110 has a hollow center 120. There may be radial structural supports in form of a specific center structure 130 to the hollow cylinder as a reinforced wall to maintain rigidity, structural integrity and to make the rolling action smoother rather than jerky movements. The shape of the roller 110 may be of any geometrical shape such as cylindrical, hour glass, conical, dog bone, oblong, rod, egg shaped and a combination there of such but not limited to these. The rational is for guiding the dough ball from a first position to a final position without sticking to the roller and to follow a specific path. The roller 110 may also have a motor to control its movement and be guided by the software. It may also have a gear box and may also use the motor of the transfer apparatus. A roller may have a specific surface structure, specific shape and specific center structure, a motor to power the roller to rotate around an axis; and software to control a speed of rotation around the axis. Wherein the specific center structure is a hollow cylinder with a reinforced wall to maintain rigidity and structural integrity and wherein the specific shape is used to guide a food product in a specific trajectory. In one aspect, the specific surface has at least one of a plurality of grooves, a recessed surface, a raised surface along the length of the roller to minimize sticking of the dough product. The roller 110 may also be made up of a nonstick material.

Figure 2:
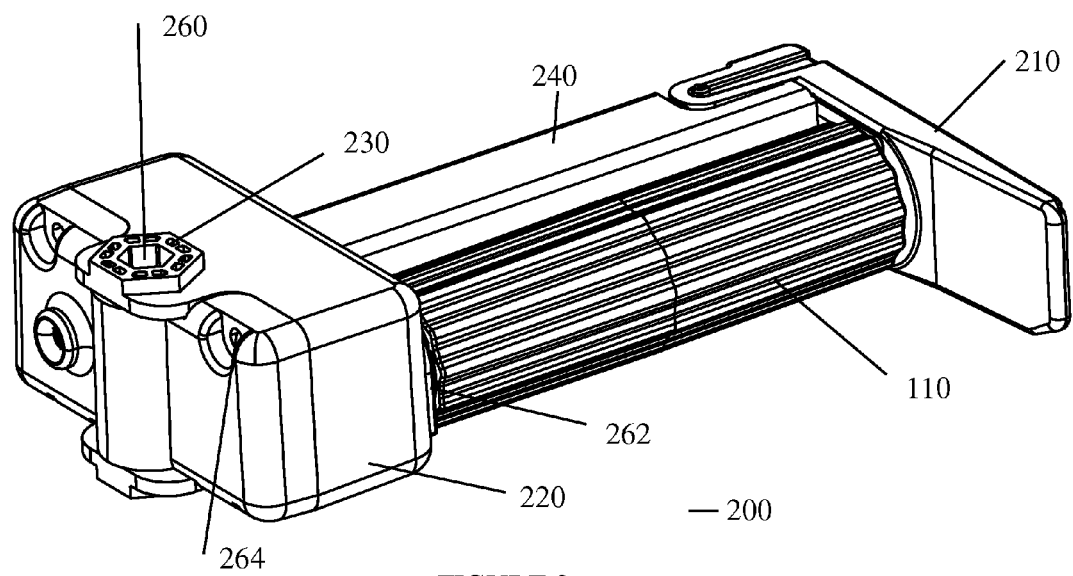
FIG. 2 show a perspective view of the arm 200.

FIG. 2 shows a perspective view of the arm 200. The arm 200 has several components. The roller 110, a base 220 attached to food appliance, a back support 240 and a flap 210. Roller 110 can be de-attached for easy cleaning by opening the flap 210. Arm 200 is powered by a transfer motor 260 to move a dough product such as a dough ball from a first position to a second position. Preferably, arm 200 moves from the first position to the final position in an arc-like or sweeping manner. Arm 200 has roller 110. Preferably roller 110 is a cylindrical drum. Preferably roller 110 is connected to, and extends across the length of arm 200. Roller 110 is powered by a motor 262 such that it can rotate around an axis. Preferably arm 200 has flap 210 at its outer edge. Preferably, flap 210 has a surface that is flush with both arm 240 and roller 110. When this is coupled with the sweeping motion of arm 240, the dough product or dough ball 420 is rolled forward. Flap 210 ensures that the dough product does not slide out of the sweeping trajectory or the area of the arm movement. The flap has a specific surface which comprises of at least one of a plurality of grooves, a recessed surface, a raised surface along the length of the flap to minimize sticking of the dough product.

Figure 3:
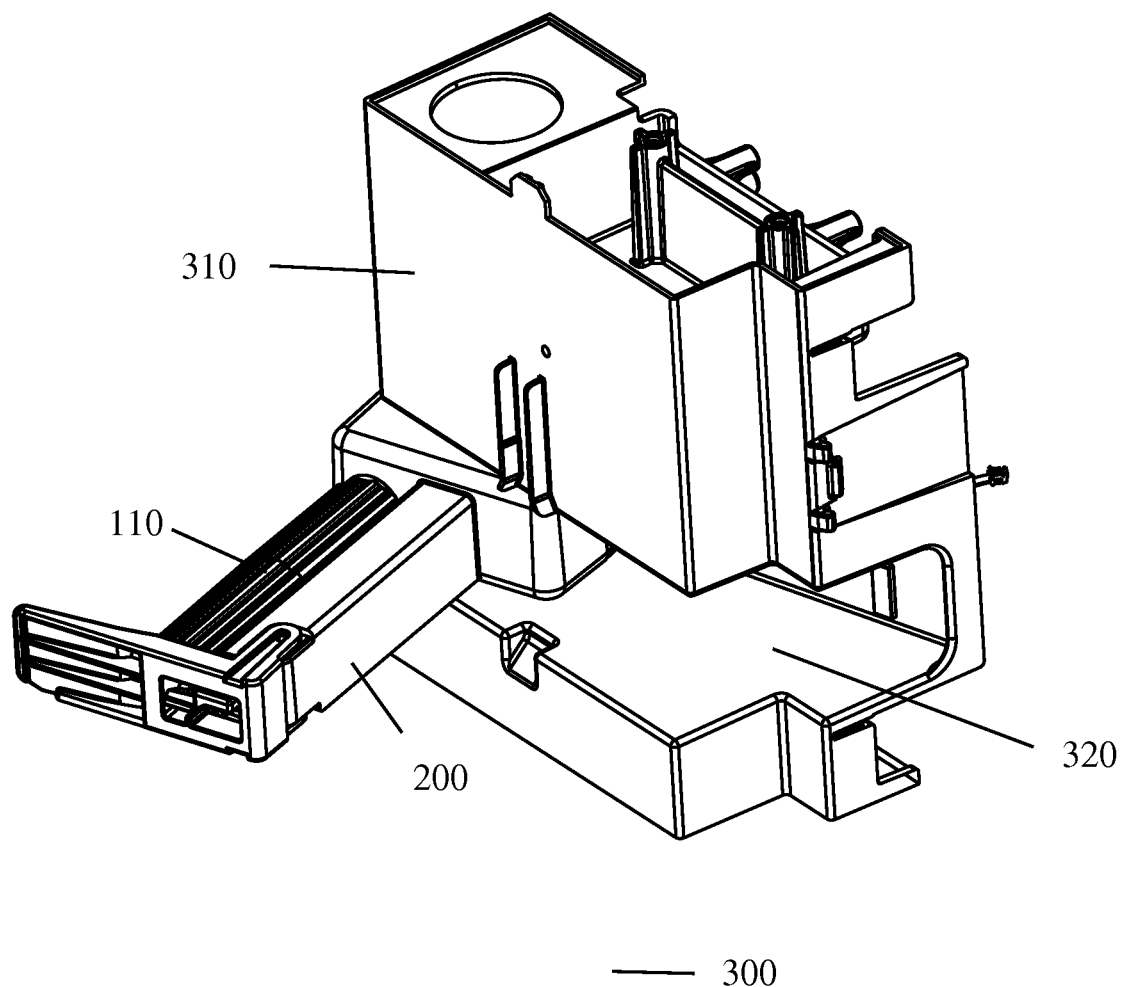
FIG. 3 show a perspective view of the transfer apparatus 300.

FIG. 3 shows transfer apparatus 300 comprising of an arm 200 and the roller 110 attached to a housing 310. A recessed space 320 is designed to receive the arm 200 in a resting condition or when the machine is nonfunctional. The groove 230 is used for securing the arm 200 to the housing 310. The housing 310 may house the transfer motor, sensor and an actuator to control the arm 200.

Figure 4:
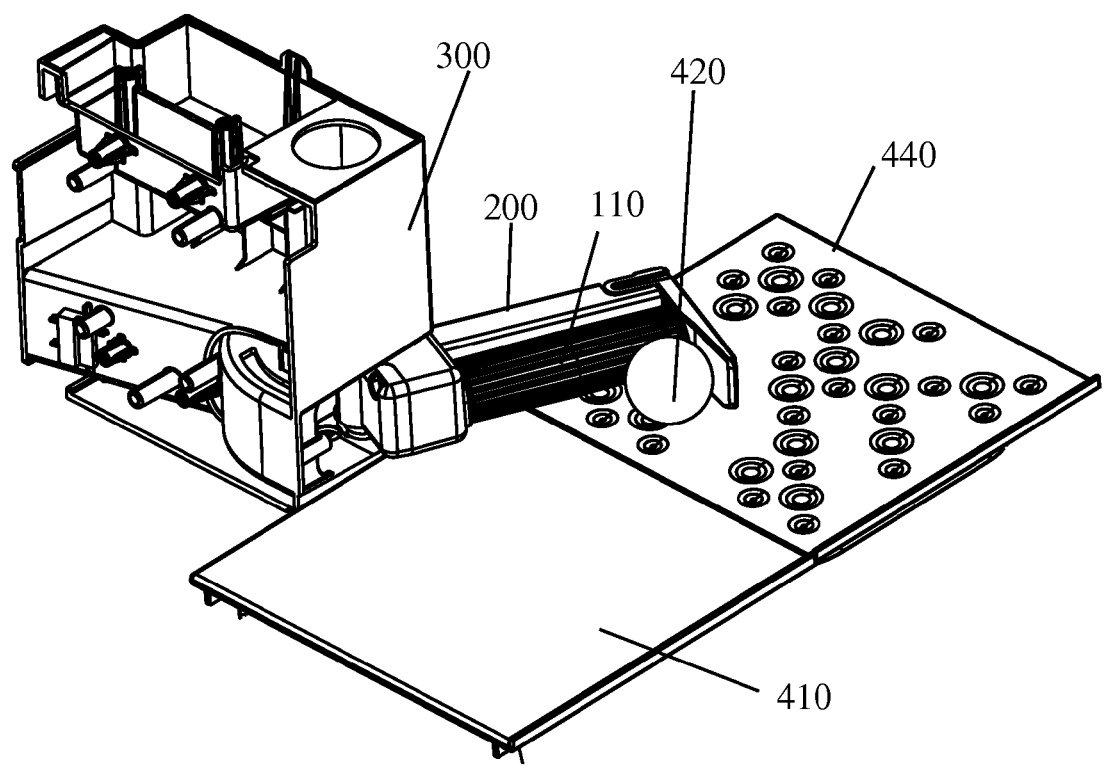
FIG. 4 shows the method in which the roller is being used to move the dough ball.

FIG. 4 shows the method in which the roller is being used to move the dough ball 420. The dough ball 420 is being moved from first platen 440 to platen 410 for flattening. The start point (not shown) is the transfer base where the dough ball after being made is kept at that position. A method to transfer a dough ball 420 using arm 200 comprises of contacting the dough ball resting on a transfer station using a roller of the arm or the transfer apparatus. Every flour type has unique composition and when mixed with any liquid such as milk or water and/or oil it creates a specific viscoelasticity. Only at a certain range the dough ball attains optimal viscoelasticity which may be described as non-sticky, resilient and firm shaped. This optimal viscoelasticity containing dough ball 420 can be used for making flattened dough and subsequently cooked as flat bread. Many steps are involved in these types of appliances and this instant invention describes one such function in which the dough ball 420 is transferred from one location to another mechanically without human intervention. The stickiness of the dough ball creates a resistance force. In another step, the resistance is determined from the dough ball using a sensor. The software residing in a processor is self-learning software and guides the sensor. A disc having plurality of lines enables counting of the lines that pass through the position and/or speed sensor to determine a position and/or speed of the arm 200. A sensor 264 may comprise of limit switches, optical encoder etc., but not limited to these. In another embodiment, a tangential force and a forward movement force that is required by the roller to move the dough ball is determined using the sensor data. In one step, a motor speed of the arm is controlled using software residing in a processor.

Figures 5A, 5B:
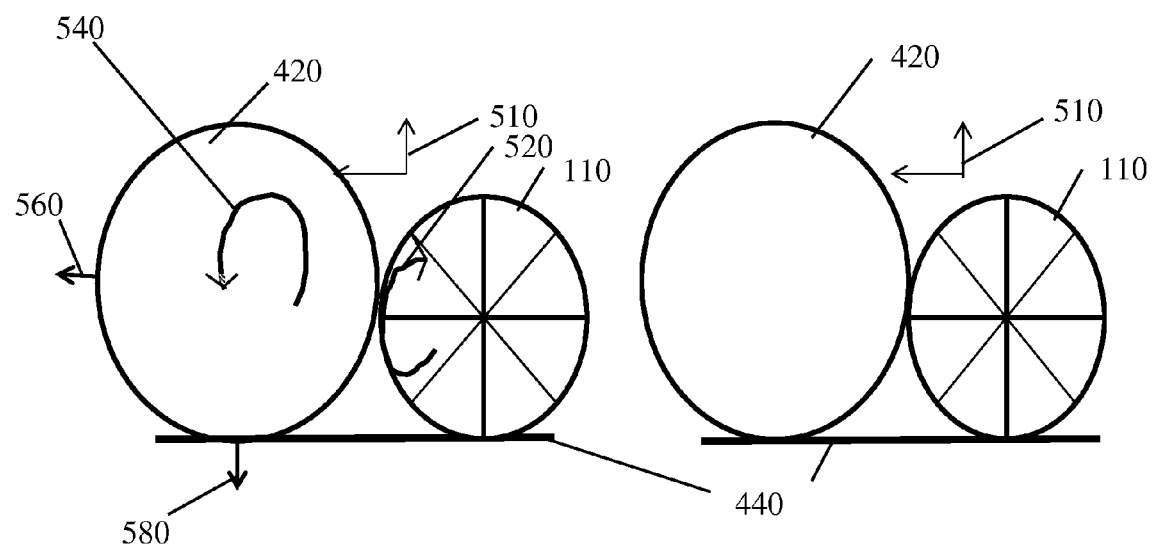
FIGS. 5A and 5B shows the different forces being applied to move the dough ball by the arm and roller movement.

FIGS. 5A and 5B describe the following method and steps that are being taken by the arm 200. Once the resistance 580 has been determined the exertion of the tangential force 510 and the forward movement force 560 to the dough ball using the roller 110 rotating in a clockwise direction 590 and the arm in the forward or angular motion is done. In another embodiment, the dough ball or food product 420 is rolled and/or moved in an opposite direction or an anti-clock wise 540 direction forward towards the platen 440 for flattening. Also the upwards movement by the roller allows the force to be applied in a specific direction. This upward movement lifts the ball slightly to be pushed forward by the anti-clock wise or opposite movement and the arm moving in an arc. This upward movement prevents the dough ball from getting stuck underneath the roller. If there is any resistance in the forward motion from the dough ball the method is rejected and a message is displayed to the user regarding the rejection due to high resistance from the dough ball.

Roller 110 can have dedicated software to control its speed. Therefore, arm 200 and roller 110 can move at different speeds. However, the motion speed of arm 200 is related to and dependent on the rotational speed of roller 110. Software is used to control the motion speed of arm 200 so as to not be faster than the time it takes roller 110 to nudge and/or drop the dough product or else there is risk of the dough product getting stuck or getting run over. The rotational speed of roller 110 is detected by counting lines on a disc that passes through an optical sensor encoder.

Cleaning of these apparatus and appliances are a nightmare for all that use them. Modular design of the transfer apparatus 110 has made it very convenient to clean the roller 110 by detaching the roller after removing the flap.

Although the present embodiments have been described with reference to specific examples embodiments, it will be evident that various modifications and changes may be made to these embodiments without departing from the broader spirit and scope of various embodiments. Accordingly, the specification and drawings are to be regarded in an illustrative rather than a restrictive sense.

What is claimed is:

1. A transfer apparatus, comprising:
   a transfer system including an arm having a roller in a horizontal position, back support that runs along the length of the roller, and a flap perpendicular to the back support and the arm to move a dough product from a first position to a final position; and
   wherein the transfer system further includes a transfer motor configured to power the arm, a sensor configured to power the arm, and a software, the software residing in a processor, the processor measures at least one of a resistance created by the dough product and when measured by contacting the dough product and change in a speed and position of the arm and calibrates the speed and position of a specific movement of the arm using a feedback mechanism from the software residing in the processor to move the dough product.

2. The transfer apparatus of claim 1, further comprising:
   a roller having a specific surface structure, specific shape and specific center structure, that extends across the length of the arm, to move a dough product without the roller sticking to the dough product;
   a motor to power the roller to rotate around an axis; and
   a software to control a speed of rotation around the axis.

3. The transfer apparatus of claim 2, wherein the specific center structure is a hollow cylinder with a reinforced wall to maintain rigidity and structural integrity.

4. The transfer apparatus of claim 2, wherein the specific shape is used to guide a food product in a specific trajectory.

5. The transfer apparatus of claim 2, wherein the specific surface has at least one of a plurality of grooves, a recessed surface, a raised surface along the length of the roller to minimize sticking of the dough product.

6. The transfer apparatus of claim 1, further comprising:
   a heating unit is used for a heating means residing in the arm to prevent a stickiness of the dough product, wherein the heating unit is at least one of a convention, conductance and radiation.

7. The transfer apparatus of claim 1, wherein the specific movement is an arc movement of the arm, wherein the flap is attached and flushed to the roller and the back support to prevent the dough product from moving away from the arc movement of the arm.

8. The transfer apparatus of claim 1, wherein the flap having a specific surface guides the dough product and contains the dough product within the movement area of the arm.

9. The transfer apparatus of claim 8, wherein the specific surface of the flap has at least one of a plurality of grooves, a recessed surface, a raised surface along the length of the flap to minimize sticking of the dough product.

10. The transfer apparatus of claim 1, wherein the transfer motor controls the speed and movement of the arm.

\* \* \* \* \*